No. 127,408

UNITED STATES PATENT OFFICE.

WILLIAM H. FARNHAM, OF SPARTA, WISCONSIN.

IMPROVEMENT IN TOOTH-POWDERS OR DENTIFRICES.

Specification forming part of Letters Patent No. 127,408, dated June 4, 1872; antedated May 17, 1872.

*To all whom it may concern:*

Be it known that I, WILLIAM H. FARNHAM, of Sparta, in the county of Monroe and State of Wisconsin, have invented a new and Improved Dentifrice; and I do hereby declare that the following is a full, clear, and exact description thereof, which will enable others skilled in the art to make and use the same.

The present invention relates to a new and improved compound and dentifrice to be used for cleaning, beautifying, and preserving the teeth, which dentifrice or compound is composed of the following ingredients mixed together in the proportions named, or thereabout, and in the manner as hereinafter explained.

Pulverized best English precipitated chalk, thirty-two parts; pulverized Jenning's magnesia-alba, sixteen parts; pulverized white granulated sugar, twenty-four parts; pulverized common starch, thirty parts; fluid extract of sapindus, or extract from the berry and root of the West India soap-berry tree, four parts, mixed with twelve parts of distilled water; three-eighths part oil winter-green; and two parts of pulverized white Castile soap.

These ingredients are mixed together thoroughly, and kneaded into a dough of suitable consistency, then rolled out into a thin sheet and cut into round or lozenge-shaped pieces by suitable means; after which such pieces or lozenges can be spread upon cloth or muslin and subjected to the action of a moderate heat until dry, when the preparation is ready for use, or for being boxed up for transportation and sale.

To use the lozenges or compound made of the above-specified ingredients, and in the manner stated, the person should place a lozenge in the mouth and powder it with the teeth; then wet a fine tooth-brush with cold water and rub the teeth briskly until a lather is produced, which will not only thoroughly clean and beautify the teeth, but will prevent the accumulation of tartar and eradicate scurvy, canker, and all diseases of the gums.

Although I have named certain proportions of the several ingredients composing my new and improved dentifrice for cleaning, beautifying, and preserving the teeth, healing the gums, purifying the breath, and cleansing the mouth, I do not intend to limit myself to the precise and particular proportions of each named, as they can be varied and yet produce the desired results; but I have found by experiment and actual trial, by using a compound composed of the several ingredients named and mixed together in the proportions stated, that a safe, pleasant, reliable, and effective dentifrice for removing all injurious substances from the teeth, protecting the gums from disease, purifying the breath, and cleansing the mouth from impurities, is effected.

To the above composition may be added advantageously eight parts of pulverized soap-berry tree bark.

Having thus described my invention, I claim as new and desire to secure by Letters Patent—

The dentifrice composed of the several ingredients, mixed together in or about the proportions stated, and for the purposes specified.

The above specification of my invention signed by me this 30th day of September, 1871.

WM. H. FARNHAM.

Witnesses:
GEORGE GIPPLE,
WM. H. NOTT.